(12) United States Patent
Tsao et al.

(10) Patent No.: US 8,023,682 B2
(45) Date of Patent: Sep. 20, 2011

(54) PORTABLE ELECTRONIC DEVICE WITH SPATIAL MODULE

(75) Inventors: Mei-Tsu Tsao, Tu-Cheng (TW);
Jia-Ren Chang, Tu-Cheng (TW);
Ching-Sen Tsai, Tu-Cheng (TW)

(73) Assignee: Chi Mei Communications Systems, Inc., Tu-Cheng, New Taipei (TW)

( * ) Notice: Subject to any disclaimer, the term of this patent is extended or adjusted under 35 U.S.C. 154(b) by 531 days.

(21) Appl. No.: 12/333,444

(22) Filed: Dec. 12, 2008

(65) Prior Publication Data
US 2010/0034415 A1 Feb. 11, 2010

(30) Foreign Application Priority Data
Aug. 8, 2008 (CN) .......................... 2008 1 0303636

(51) Int. Cl.
*H04R 1/02* (2006.01)
(52) U.S. Cl. ...................................................... 381/386
(58) Field of Classification Search .......... 381/334–433; 455/575.1; 379/440–444
See application file for complete search history.

(56) References Cited

U.S. PATENT DOCUMENTS

| 7,933,637 B2 * | 4/2011 | Gammon et al. | 455/575.1 |
| 2004/0240698 A1 * | 12/2004 | Eaton | 381/351 |
| 2005/0047621 A1 * | 3/2005 | Cranfill et al. | 381/334 |
| 2009/0290744 A1 * | 11/2009 | Wu et al. | 381/387 |

* cited by examiner

*Primary Examiner* — Michael Trinh
*Assistant Examiner* — Lawrence Tynes, Jr.
(74) *Attorney, Agent, or Firm* — Altis Law Group, Inc.

(57) ABSTRACT

A portable electronic device includes a housing, a circuit board, a speaker and a spatial module. The housing includes a bottom wall and a circular wall extending from the bottom wall. The bottom wall defines a sound-emitting hole. The bottom wall and the circular wall define a receiving cavity. The circuit board is positioned on the circular wall to cover the receiving cavity and includes a first surface and an opposite second surface and defines a through hole running through the circuit board. The through hole is in communication with the receiving cavity. The speaker is electrically fixed to the first surface and received in the receiving cavity with the sound-emitting surface thereof facing the sound-emitting hole. The spatial module positioned on the second surface defines a groove in communication with the through hole.

9 Claims, 6 Drawing Sheets

PORTABLE ELECTRONIC DEVICE WITH SPATIAL MODULE

BACKGROUND

1. Technical Field

The present disclosure relates to a portable electronic device with a spatial module.

2. Description of the Related Art

Multimedia technology is now commonly integrated with portable electronic devices, such as personal digital assistants and cell phones to meet an increasing demand portable entertainment. In these devices, a speaker is generally included.

Referring to FIG. 6, a typical portable electronic device 10 may include a housing 110, a speaker 120, a circuit board 130 and a plurality of passive/active electronic components 140 positioned on the circuit board 130. The housing 110 includes a bottom wall 112 and a circular wall 114 perpendicularly extending from the bottom wall 112. The bottom wall 112 defines a plurality of through holes 116. The circuit board 130 is placed on the circular wall 114. As a result, the circuit board 130, the circular wall 114, and the bottom wall 112 form a cavity 118. The cavity 118 communicates with the plurality of through holes 116. The speaker 120 is received in the cavity 118 and is electrically connected to the circuit board 130. A sound emitting surface 122 of the speaker 120 faces the plurality of through holes 116. When the speaker 120 is activated, air in the cavity 118 is resonated by the sound emitted from the speaker 120.

For a high-quality sound effect, a large-volume resonating cavity 118 is required. A typical way to create a large volume cavity 118 is to increase the distance between the circuit board 130 and the bottom wall 112 of the housing 110. However, this increases the thickness of the electronic device 10, making the electronic device less portable.

Therefore, there is room for improvement within the art.

DETAILED DESCRIPTION OF THE EMBODIMENTS

Figure 1:
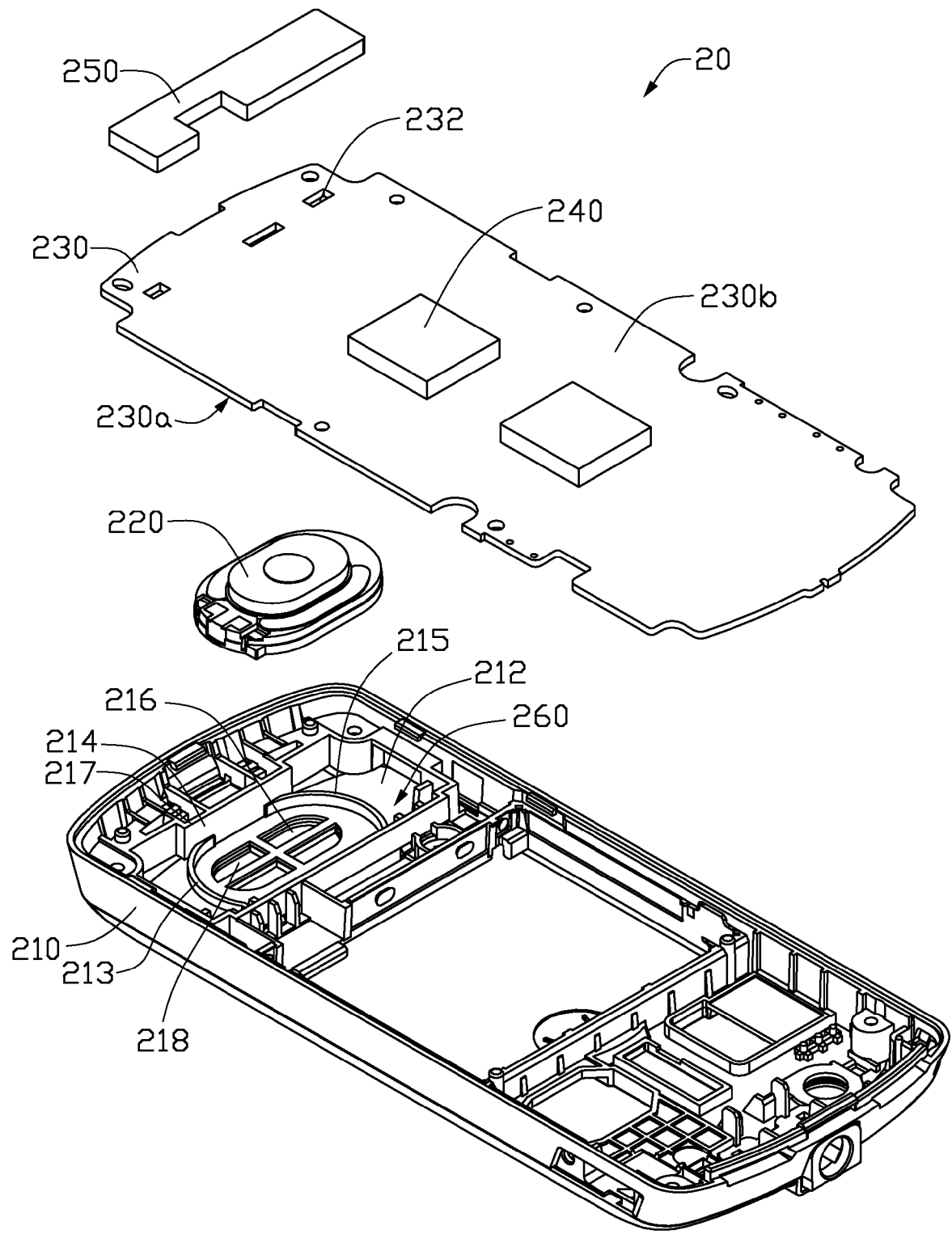
FIG. 1 is a disassembled isometric view of a portable electronic device including a spatial module according to an exemplary embodiment.

Referring to FIG. 1, a portable electronic device 20, such as a cell phone according to an exemplary embodiment includes a housing 210, a speaker 220, a circuit board 230, a number of electronic components 240, and a spatial module 250.

The housing 210 is made from a damping material and includes a bottom wall 212 and a circular wall 214 extending from the bottom wall 212. In this embodiment, the circular wall 214 is approximately perpendicular to the bottom wall 212. The bottom wall 212 and the circular wall 214 form a first receiving cavity 260. The bottom wall 212 defines a number of sound-emitting holes 216. The speaker 220 is received in the first receiving cavity 260 with a sound-emitting surface of the speaker 220 facing the sound-emitting holes 216. A first sidewall 213 and an opposite second sidewall 215 separately extend from the bottom wall 212 inside the circular wall 214. The height of the first sidewall 213 and the second sidewall 215 are respectively shorter than that of the circular wall 214. The sound-emitting holes 216 are defined between the first sidewalls 213 and the second sidewall 215. The first sidewall 213, the second sidewall 215 and the bottom wall 212 define a second receiving cavity 218. Therefore, the second receiving cavity 218 is inside the first receiving cavity 260 and is in communication with the first receiving cavity 260. The speaker 220 is further received in the second receiving cavity 218.

Figure 2:
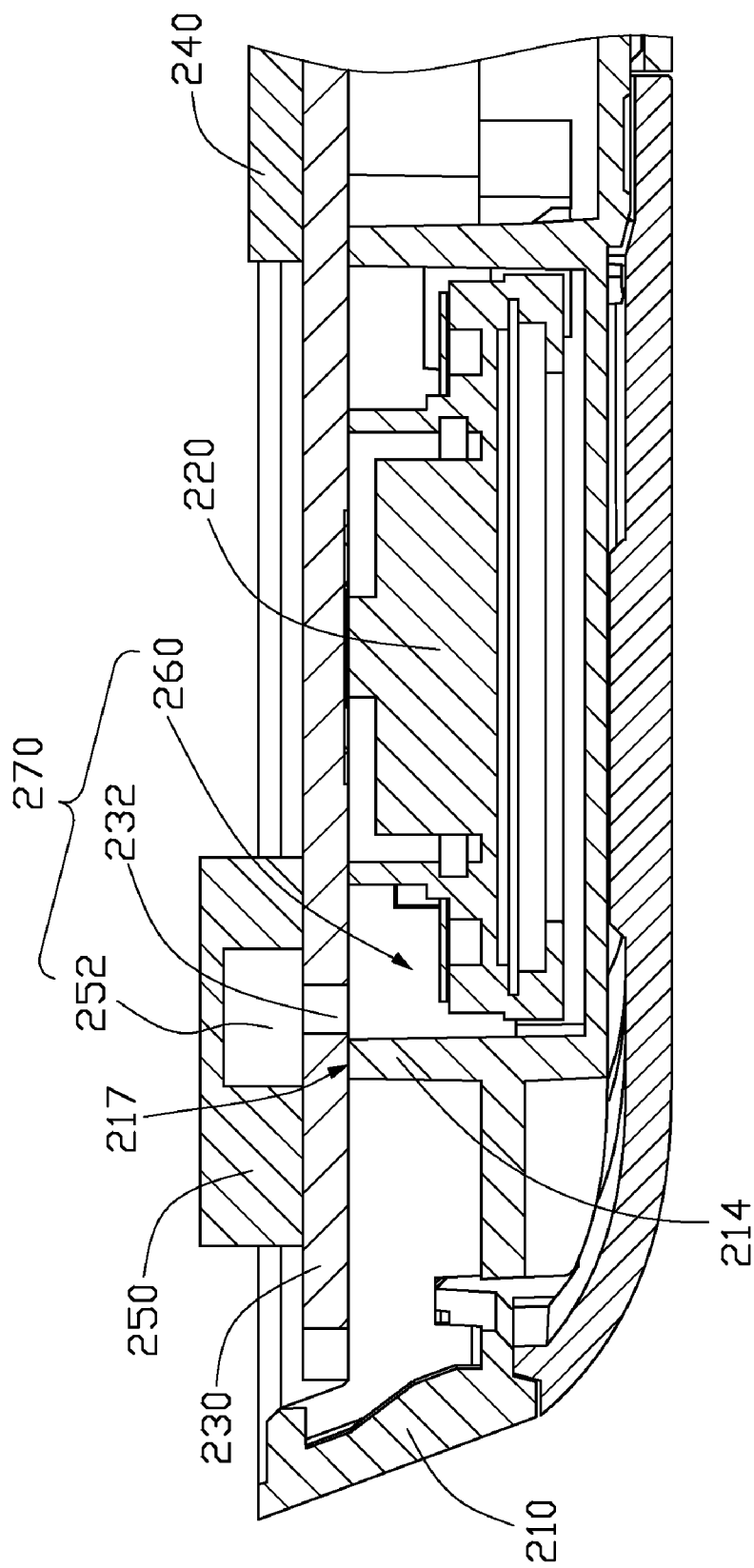
FIG. 2 is a partial cross-sectional view of the portable electronic device of FIG. 1.

Referring to FIG. 2 together with FIG. 1, the circuit board 230 is positioned on the circular wall 214 to cover the first receiving cavity 260 and includes a first surface 230a facing the bottom wall 212 and a second surface 230b opposite to the first surface 230a. The circuit board 230 defines a number of through holes 232 running through the first surface 230a and the second surface 230b. In this embodiment, the circuit board 230 defines three through holes 232. The through holes 232 are in communication with the first receiving cavity 260.

The speaker 220 may be fixed to the first surface 230a of the circuit board 230 by adhesive, engagement, or welding. The electronic components 240 are fixed to the second surface 230b of the circuit board 230 opposite the first surface 230a. The spatial module 250 is positioned on the second surface 230b of the circuit board 230 where the electronic components 240 are fixed.

Figure 3:
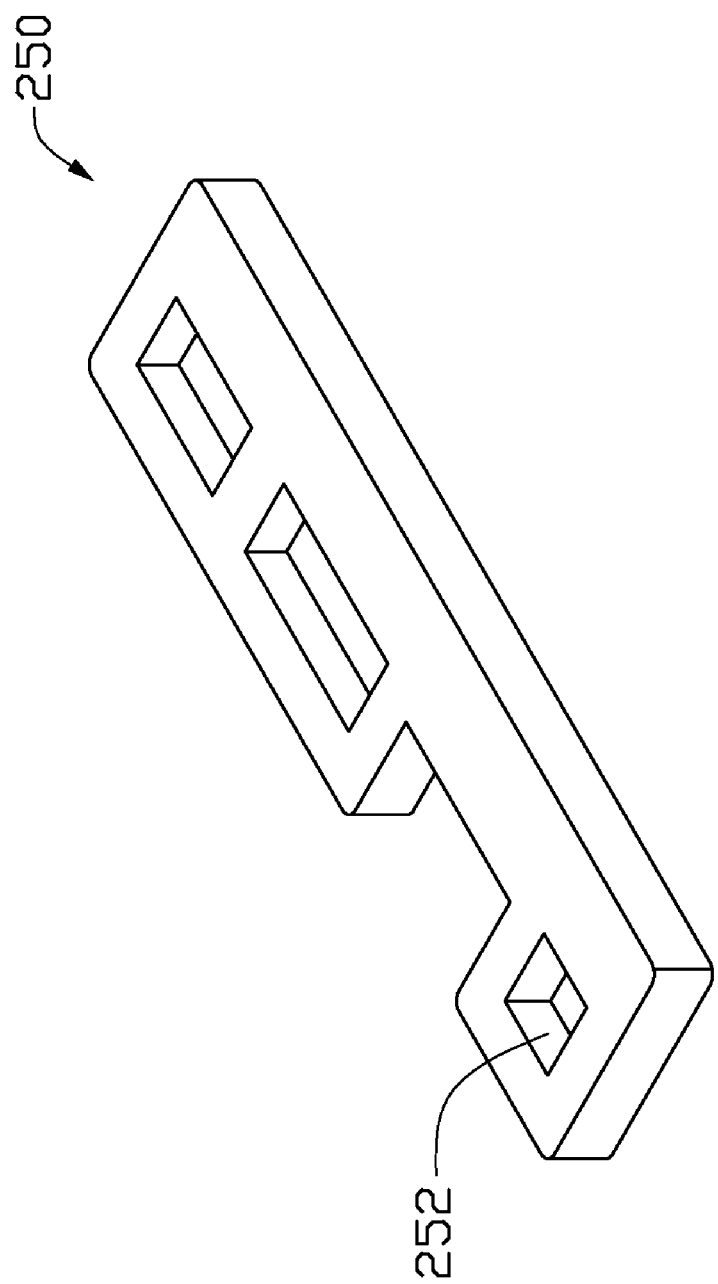
FIG. 3 is an isometric view of the spatial module of the portable electronic device of FIG. 1.

Referring to FIGS. 2, and 3, the spatial module 250 is made from a damping material. The spatial module 250 defines three grooves 252 in a surface of the spatial module 250 facing the circuit board 230. The spatial module 250 hermetically covers the three through holes 232 with the three grooves 252 in communication with the three through holes 232. As a result, the first receiving cavity 260 is in communication with the three grooves 252 using the three through holes 232. The first receiving cavity 260, the three through holes 232, and the three grooves 252 form a resonating chamber 270.

When the speaker 220 is activated, sound emitted from the speaker 220 is reflected back to the resonating chamber 270 so that air in the resonating chamber 270 resonates with the sound.

Figure 4:
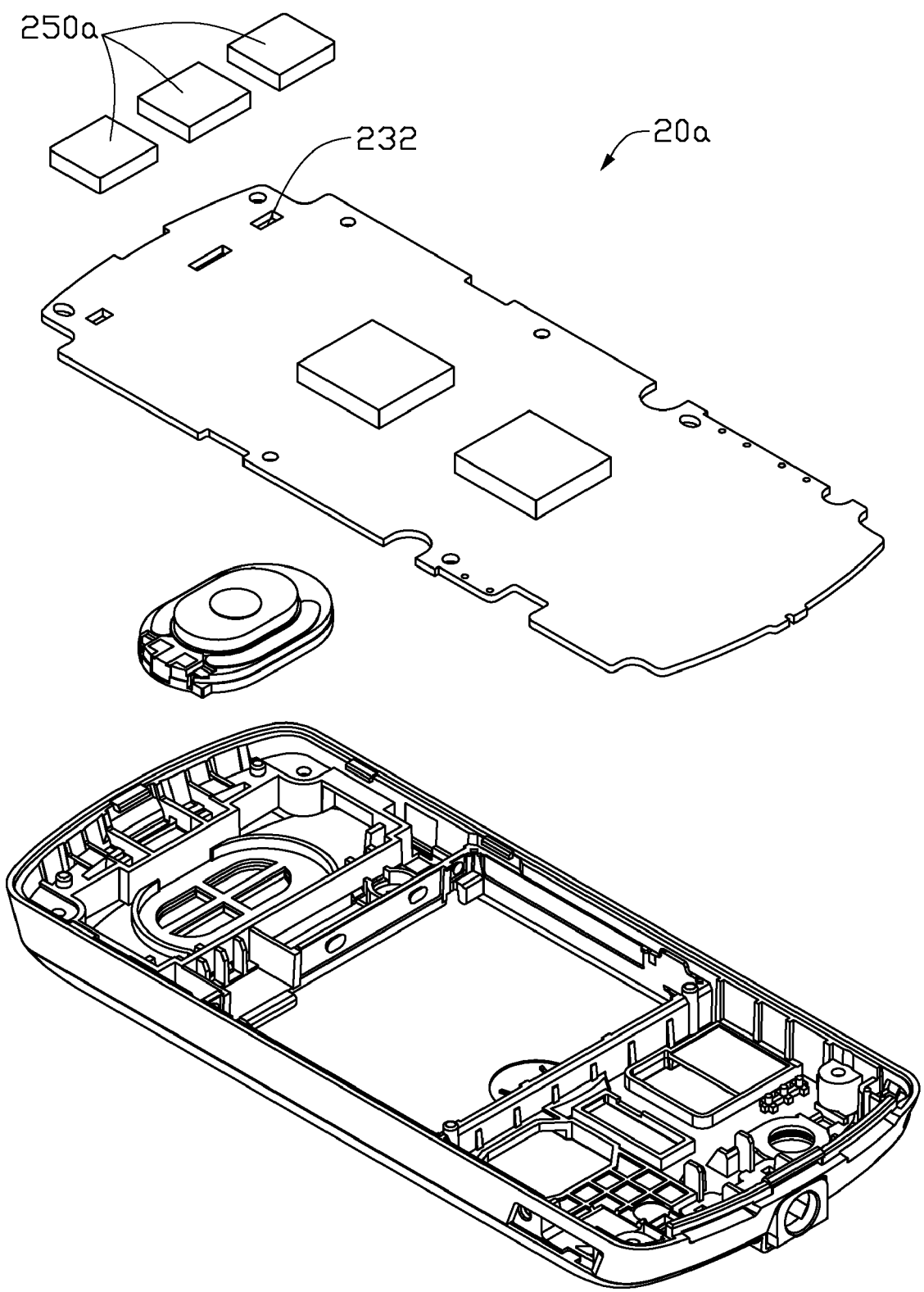
FIG. 4 is a disassembled isometric view of a portable electronic device including a number of spatial modules according to another exemplary embodiment.
Figure 5:
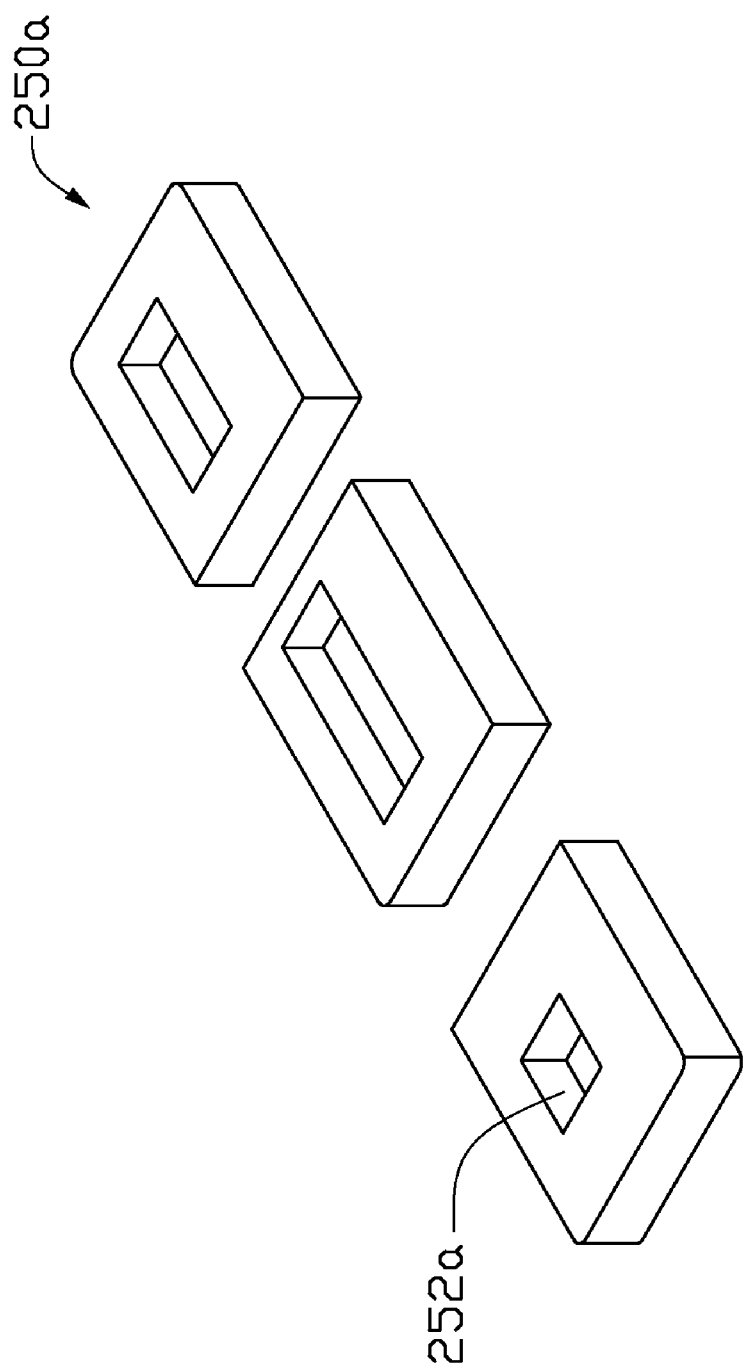
FIG. 5 is an isometric view of the spatial modules of the portable electronic device of FIG. 4.
Figure 6:
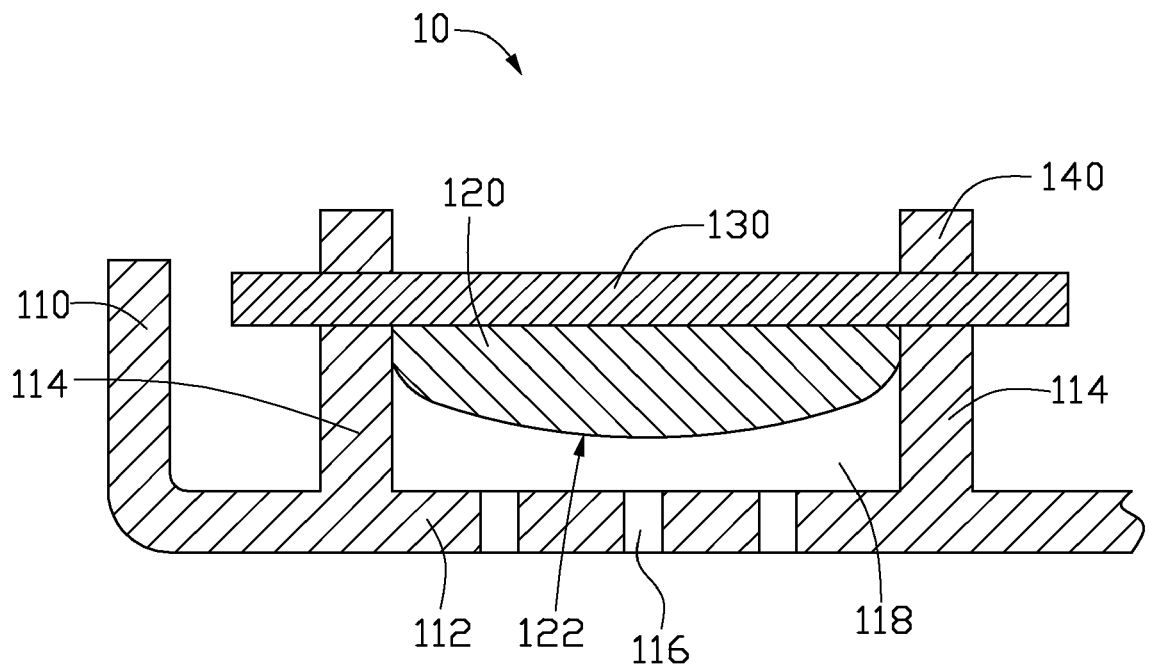
FIG. 6 is a cross-sectional view of a typical portable electronic device.

Referring to FIGS. 4 and 5, an electronic device 20a according to another exemplary embodiment is shown. The difference between the electronic device 20a of this embodiment and the electronic device 20 is that the electronic device 20a includes three spatial modules 250a. Each spatial module 250a defines a groove 252a and covers a corresponding one of the through holes 232 with the grooves 252a in communication with through holes 232.

In summary, due to employing one or more spatial modules disposed on the circuit board, which defines a number of grooves communicated with the first receiving cavity 260 via the through holes 232 defined in the circuit board, the volume of the resonating chamber of the electronic device can be enlarged. As a result, the sound effect of the electronic device is improved. In addition, because the one or more spatial modules are disposed on the surface of the circuit board that holds the electronic components, no special room is needed. Therefore, volume of the electronic device is not increased.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device comprising:
   a housing comprising a bottom wall and a circular wall extending from the bottom wall, the bottom wall defining at least one sound-emitting hole, the bottom wall and the circular wall defining a first receiving cavity;
   a circuit board positioned on the circular wall to cover the first receiving cavity, the circuit board comprising a first surface and an opposite second surface and defining at least one through hole running through the circuit board, the at least one through hole being in communication with the first receiving cavity;
   a speaker electrically fixed to the first surface and received in the first receiving cavity with the sound-emitting surface thereof facing the at least one sound-emitting hole; and
   at least one spatial module positioned on the second surface and defining at least one groove, the at least one groove being in communication with the at least one through hole.

2. The portable electronic device as claimed in claim 1, wherein a first sidewall and an opposite second sidewall separately extend from the bottom wall inside the circular wall, and the first sidewall, the second sidewall and the bottom wall form a second receiving cavity, and the at least one sound-emitting hole is defined between the first sidewall and the second sidewall.

3. The portable electronic device as claimed in claim 2, wherein the height of the first sidewall and the second sidewall are respectively shorter than that of the circular wall.

4. The portable electronic device as claimed in claim 1, wherein the circuit board defines a plurality of through holes, and the electronic device comprises a plurality of spatial modules, each spatial module defining a groove and covering each through hole hermetically in a manner that the groove is in right communication with the through hole.

5. The portable electronic device as claimed in claim 1, wherein the housing is made from a damping material.

6. The portable electronic device as claimed in claim 1, wherein the at least one spatial module is made from a damping material.

7. The portable electronic device as claimed in claim 1, wherein the device is a personal digital assistant.

8. The portable electronic device as claimed in claim 1, wherein the device is cell phone.

9. The portable electronic device as claimed in claim 1, further comprising a plurality of electrical components electrically fixed to the second surface of the circuit board.

* * * * *